United States Patent [19]

Duncan et al.

[11] 4,240,152
[45] Dec. 16, 1980

[54] OBJECT INDICATOR FOR MOVING VEHICLES

[76] Inventors: Robert L. Duncan, P.O. Box 887, Radford, Va. 24141; Paris H. Wiley, 205 Maywood St., Blacksburg, Va. 24060

[21] Appl. No.: 915,728

[22] Filed: Jun. 15, 1978

[51] Int. Cl.³ .................... G01S 15/42; G01S 15/93
[52] U.S. Cl. .................................. 367/108; 367/112; 367/909
[58] Field of Search ............. 340/1 R, 1 C, 1 T, 3 C; 343/7 VM, 112 CA; 367/107, 108, 111, 112, 909

[56] References Cited

U.S. PATENT DOCUMENTS

| | | | |
|---|---|---|---|
| 3,528,053 | 9/1970 | Rubin | 340/1 C |
| 3,539,978 | 11/1970 | Stedtnitz | 340/1 C |
| 3,705,772 | 12/1972 | Andreas | 340/1 R |
| 3,842,397 | 10/1974 | Sindle | 340/1 R |
| 4,015,232 | 3/1977 | Sindle | 340/1 T |
| 4,045,766 | 8/1977 | Iida et al. | 340/1 R |
| 4,119,939 | 10/1978 | Katakura | 340/1 R |

Primary Examiner—Richard A. Farley
Attorney, Agent, or Firm—Cushman, Darby & Cushman

[57] ABSTRACT

A system for locating and determining the distance to an object with respect to a movable vehicle is provided which utilizes at least three transducers wherein at least two of the three transducers operates either as a receiver transducer, in which case the remaining transducer operates as a transmitter transducer, or two of the three transducers operate as transmitter transducers in which case the remaining transducer operates as a receiver transducer with the system also including means for sequentially operating the three transducers for sending and receiving reflected ultrasonic signals to simultaneously determine both the location and distance of persons or objects with respect to the transducers.

14 Claims, 11 Drawing Figures

OBJECT INDICATOR FOR MOVING VEHICLES

BACKGROUND OF THE INVENTION

The present invention relates to a device for indicating to the operator of a vehicle the presence of and the distance to an object toward which it may be moving. More specifically, this invention relates to an ultrasonic distance calculator and warning device particularly suitable for pleasure and commercial vehicles for detecting and providing information as to the proximity and location of both stationary and moving objects with respect to various portions of the vehicle.

Generally large vehicles such as trucks, cement mixers, mining equipment and large recreational vehicles such as mobile homes and campers have certain large "blind" spots surrounding the vehicle which cannot be easily observed by the vehicle operator. These blind spots are usually located at the rear of the vehicle where the operator finds the configuration or design of the vehicle obstructs his full view. This is particularly apparent when the vehicle is being moved in reverse, in which case lack of full view may cause collisions resulting in loss of life and property. In order to help avoid such collisions, there is a need for a reliable and inexpensive device for sensing such obstructions and bringing their location and distance from the vehicle to the attention of the vehicle operator.

Other situations in which there is a need for a sensing device to prevent an operator of a vehicle from inadvertently colliding with objects or persons include the movement of mining equipment into areas where vision is obstructed by, for example, mine dust, avoiding collisions between airplane wingtips with other objects when an airplane is taxiing in a confined area, and the movement of tall vehicles beneath low overhanging structures.

In the prior patented art, there has been provided ultrasonic devices which, when attached to the rear of vehicles such as trucks, measure the distance between the tailgate of the vehicle and a loading platform or other object. Such devices utilize ultrasonic pulsing systems which indicate a distance to the nearest object and warn with the use of a buzzer or similar device that the vehicle is too close to the object. In U.S. Pat. No. 3,226,673 a device for ultrasonically indicating objects rearwardly of a vehicle is disclosed in which an echo received by any of several sensors located horizontally on the back of a vehicle causes a rotating light bulb to flash, thereby indicating the presence and distance to the detected object. The device does not, however, indicate the location of the object transversely of the back of the truck.

U.S. Pat. No. 4,015,232 shows several sensors along the front, back and sides of a vehicle which separately detect the presence of an object to indicate which detector the object is closest to. The device does not, however, indicate the distance to the detected object.

The other prior art devices utilize complex and involved circuitry and components to provide information as to the location or distance of objects. Furthermore, the prior art has not provided a unified simple and economical system for simultaneously providing information both as to the distance and location of objects from a sensing system.

SUMMARY OF THE INVENTION

The disadvantages and limitations of the prior art detection devices are obviated by the present invention which provides information as to both the distance and location of objects from various portions of the vehicle. This information is provided by a novel utilization of transmitters and receivers employing ultrasonic signals which are not affected by dust, moisture, rain and other atmospheric conditions such as may be encountered in construction and mines. Furthermore, the present invention provides a simple, trouble-free unit that may be inexpensively constructed as it utilizes several alternating transducers for sending and receiving signals. Signals received are then transmitted to a display panel to indicate not only the distance to an object but also specifies the portion of the vehicle closest to an object or person.

The present invention as applied to trucks and heavy vehicles employs a plurality of ultrasonic sending and receiving transducers alternately spaced in a horizontal line along the back of the vehicle. Each of the ultrasonic detectors are coupled by timing, control and multiplexor circuitry to a distance counter, register and display, and an alarm circuit mounted adjacent to the vehicle operator and which, in a motor vehicle, is preferably mounted on the dashboard. The indicating device includes a plurality of lamps for indicating which ultrasonic device is closest to the object detected, a digital screen for indicating the distance from the object to the nearest transducer receiver, and alarm devices for warning of an iminent collision. According to the invention, each of the transmitters sequentially transmit an ultrasonic pulse which, upon reflection from a nearby object, is received by an adjacent receiver which is turned on for a short period following transmission of the pulse.

The device includes electronic timing circuitry having a controlled oscillator whose frequency is reduced several times by frequency dividers to produce signals having frequencies corresponding to the ultrasonic sound pulse, the period between ultrasonic pulses, and the distance measurement units in relation to the speed of sound. Each time an ultrasonic sound pulse is transmitted, an adjacent receiver is turned on for a period of time and the time for receipt of the reflected pulse, and consequently the distance to that object is measured. This distance is compared to a previous stored distance information from other receivers and the shortest distance measured is retained and displayed on a digital screen within view of the vehicle operator.

A light corresponding to the receiver closest to the object detected is also then energized to provide information as to the particular location of the object. A particular distance and sensor measurement will be stored in the device only until all sensors have been interogated once so that if the vehicle begins to move away from the object, the device will detect and display that information.

In addition, if the distance from the detected object to the nearest sensor is less than a predetermined distance, a warning signal such as a beeper may be set off when and if the vehicle comes within a second closer distance to the object, and a second signal such as a constant buzzer may be set off.

Other optional features which may be utilized in the system of the present invention include a switch whereby the buzzer or beeper may be turned off for a predetermined period before continuing. One convenient manner of energizing the device is to provide means for activating it when the vehicle is placed in reverse gear.

Other suitable modifications in this system are where, for example, it is desired to measure objects to the side or in front of or on top of the vehicle with further modifications becoming obvious to those skilled in the art from the following detailed description taken in connection with the accompanying drawings. It is to be understood, however, that the accompanying drawings are designed for purposes of illustration only and not as a limitation of the scope of the present invention.

DETAILED DESCRIPTION OF THE INVENTION

Figure 1:
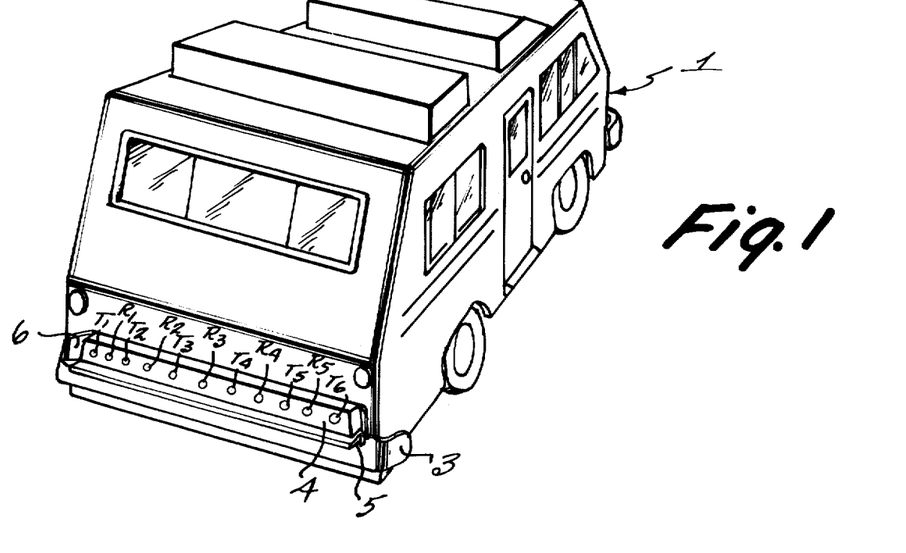
FIG. 1 illustrates one configuration in which the transducers may be disposed on a recreational vehicle such as a camper.
Figure 2:
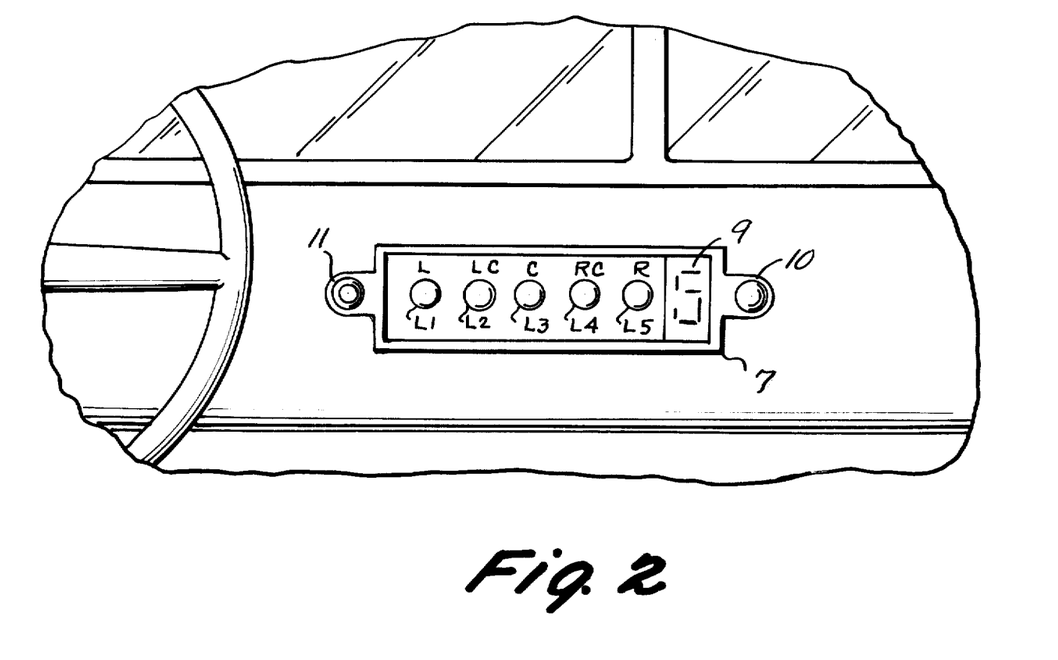
FIG. 2 is a view of the dashboard of a vehicle illustrating the disposition of an indicating and warning device in accordance with the invention.

FIG. 1 illustrates an application of the present invention to the rear of a recreational vehicle in which the novel system is mounted to the vehicle in order to permit the driver of a vehicle to be warned of unseen hazards behind the vehicle as the vehicle is maneuvered into areas of limited or no visibility. On the rear of vehicle 1 are shown six transmitter transducers and five receiver transducers alternately spaced along the top of the bumper 3 and embedded in a sound muffling material 4. The number of transducers may be increased or decreased to accomodate the width of the vehicle in order to detect any object within a specific location and distance from the back of the vehicle. The utilization of the six transmitter transducers $T_1$, $T_2$, $T_3$, $T_4$, $T_5$ and $T_6$ and five receiver transducers $R_1$, $R_2$, $R_3$, $R_4$ and $R_5$ are employed in this embodiment of the invention as a convenient alternative disposition of the elements across the length of the vehicle bumper. The disposition of a greater or smaller number of transmitter transducers and receiver transducers is contemplated for different applications along with the sequencing of the components as will be hereinafter explained in greater detail. Bottom shield 5 prevents the system from responding to the presence of the road beneath the vehicle and side shields 6 limit the detection of objects to the sides of the vehicle which are not in the vehicle path. FIG. 2 illustrates a dashboard indicator panel 7 wherein lights L1–L5 corresponding to receiver transducers $R_1$–$R_5$ provide information as to which of the receiver transducers $R_1$–$R_5$ at the rear of the vehicle is closest to the object detected. Digital readout 9 provides information as to the distance of the object from the nearest receiver, transducer $R_1$–$R_5$. Alarm transmitter 10 will be sounded when the vehicle approaches a specific distance from the object (e.g., 5 feet) and alarm 11 will be sounded when the vehicle is even closer than a predetermined distance from the object (e.g., 3 feet). Other arrangements for the display of object location and warning alarms will occur to those skilled in the art.

Figure 3:
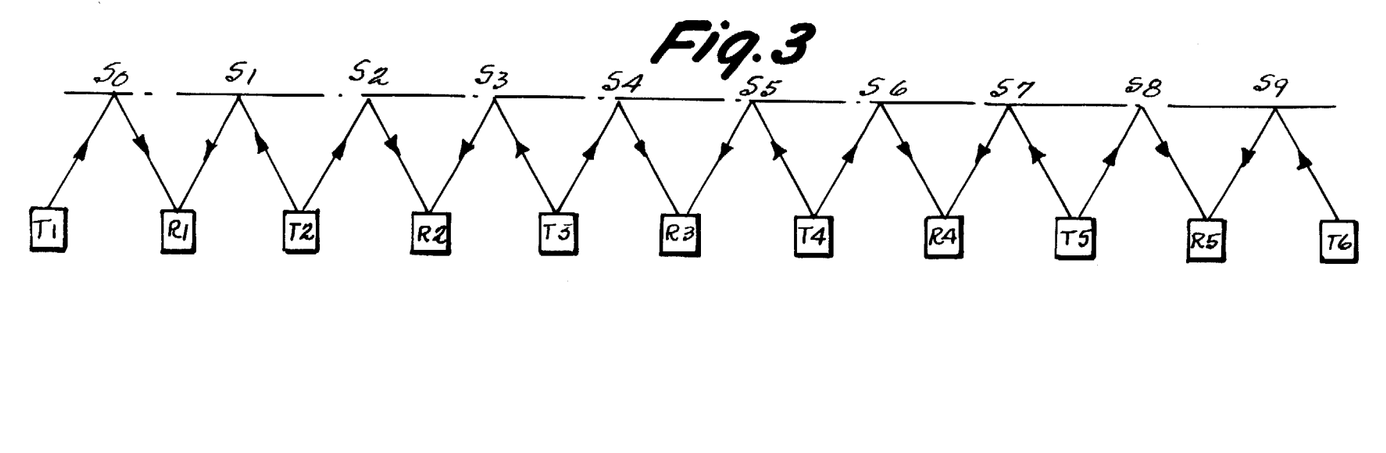
FIG. 3 illustrates the relationship between the transmitting transducers and receiving transducers and a mode of sequencing for their operation.

FIG. 3 illustrates the preferred embodiment of a sequence in which the various transmitter transducers and receiver transducers can be energized and activated to obtain a scan of the area behind the vehicle. It will be recognized that with other arrangements and to suit particular design objectives of transmitter transducers and receiver transducers a modification of the sequencing of the transducers can be provided to accommodate their particular disposition. After transmitter transducer $T_1$ emits a pulse of ultrasonic energy $S_0$, receiver transducer $R_1$ is turned on to receive the reflected pulse $S_0$, and predetermined period transmitter $T_2$ emits a pulse $S_1$ the return signal of which may be received by receiver transducer $R_1$. Transmitter transducer $T_2$ then emits a second signal $S_2$ and receiver transducer $R_2$ is energized to receive the return signal which term as utilized herein refers to a signal returned after contact with an object. This process continues through transmitter transducers $T_3$ through $T_6$ transmitting, in turn, and then returning to transmitter transducer $T_1$ for operation in the manner described above. The area transversed to the back of the truck is continuously scanned for objects. The reference characters $S_0$–$S_9$ as referred to herein also represent the states of activation of the various transmitter transducers and receiver transducers or "states" as will be described in greater detail in the discussion of FIG. 6.

It will be recognized that the advantages of the present invention can be attained by the utilization of as few as three transducers. In such applications the present system in one embodiment can utilize two of the three transducers as a first and second transmitter transducer and the third can operate as a receiver transducer in the present system which utilizes a sequential activation of the first transmitter transducer and receiver transducer as a pair for a period commensurate with the range of the system prior to activating the second transmitter transducer and receiver transducer pair. It is of course understood that in the utilization of the transmitter transducer and receiver transducer that the transmitter transducer is activated a short period of time, for example 1.7 miliseconds before the receiver transducer. In addition this system utilizes a means for determining distances by measuring time elapse between signal transmission and return signal reception. At the same time the system provides information as to the objects location by identifying the location of the transmitter transducer utilized in the transmitter transducer and transmitter receiver pair.

Similarly the present system can alternatively utilize the minimum of three transducers in an alternative form in which at least two of the three transducers operate as receiver transducers and the remaining transducer operates as a transmitter transducer. In such a system the novel sequential activation provides a period for sequencing of a first transmitter transducer with the receiver transducer pair is commensurate with the range of the system prior to activating the second transmitter transducer and receiver transducer as a pair. Similarly this system utilizes a means for determining distance by measuring time elapse between signal transmission and return signal transmission. In addition the system provides information as to the location of the object by identifying the position of the receiver utilized in the transmitter transducer and transmitter receiver pair.

Figure 4:
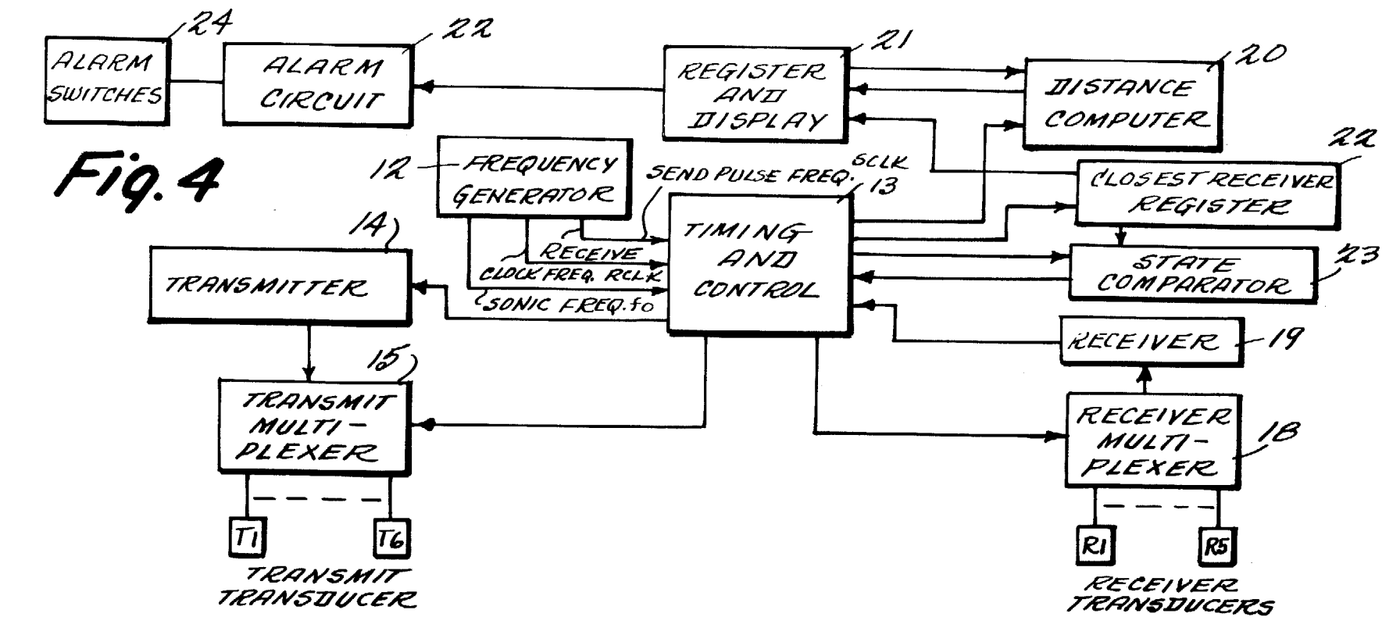
FIG. 4 is a signal flow diagram in accordance with the invention.

FIG. 4 is a block diagram illustrating the operation of the circuitry involved in this invention. Frequency generator 12 produces continuous signals of 3 frequencies which are a carrier frequency for the ultrasonic wave, for example, a 40 KHz send pulse frequency which is the frequency at which pulses are emitted from the six transmitter transducers for example 20 Hz and a receiver clock pulse frequency which are used to count the time from the emmission of a sonic pulse by a transmitter and its receipt by a receiver transducer for example 555.5 Hz which corresponds to measured foot per pulse counted. These frequency waves are inputted to a timer and control unit 13. The timer and control unit 13 generates and inputs to the transmitter 14 short ultrasonic pulses at a rate corresponding to the send pulse frequency and counts and inputs to the transmit multiplexer 15 the transmitter/receiver state (corresponding the transmitter and receiver which are active at the time e.g., $T_2$, $R_2$ transmitting and ultrasonic receiving signal $S_3$). The transmitter 14 amplifies the ultrasonic frequency pulses from the timer and control unit 13 and inputs that signal to a transmit multiplexer with gates the signal to one of the transmit transducers $T_1$ through $T_6$. After a short delay for example 1.7 ms the time and control unit 13 sends a longer receive enable pulse of for example 21 ms to the receiver multiplexer 18 which causes one of the receiver transducers to be turned on for the duration of the receive enable pulse so as to transmit a received signal to the receiver 19 which amplifies the signal, and inputs the signal to the timer and control 13 which causes the distance counter 20 to stop counting and causing the distance to the object to be calculated in distance computer 20. The above mentioned time delay corresponds to the "blind spot" equal to one half the distance between adjacent transmitter transducers and receiver transmitters, within which an object cannot be detected because of overriding noise directly between the two transducers.

Also, each time that the distance computer 20 computes a distance which is less than previously stored in register 21, timer and pulse control unit 13 transmits a pulse to closest receiver register 22 which causes the present state to be loaded into the closest receiver to the register 22 and also cause the corresponding light on the display panel 8 to light up. When the present state is the same closest receiver register 22 as the state stored in thereby indicating that a positioned object has not been detected closer to the rear of the vehicle through one entire cycle of transmit pulses (all 10 states) timer and control unit 13 will cause, the distance computer 20 to input the newly calculated distance whether or not it is less than the previously registered distance; and the current state will be loaded into the closest receiver register also displayed on the visual display.

If the value in the distance computer 20 upon comparison with the value in the register is less than the value in the register, then that distance will be latched into the register 21. The timing and control unit then causes the computed distance to be compared to the distance stored in register 21. In any case, where the registered value is less than a specific number of feet, say 5 feet, the alarm circuit will be caused to energize a signal such as a beeping tone and if a distance in the register of say 3 or less fee is measured, then a continuous alarm would be set off. The time required for the entire sequencing of the transducers including the storing and comparing of distance and location information with respect to an object generally takes about one half a second.

In addition alarm switches 24 may be designed by an ordinary person skilled in the art to turn the alarm off for either a set period of time or permanently.

Figure 5:
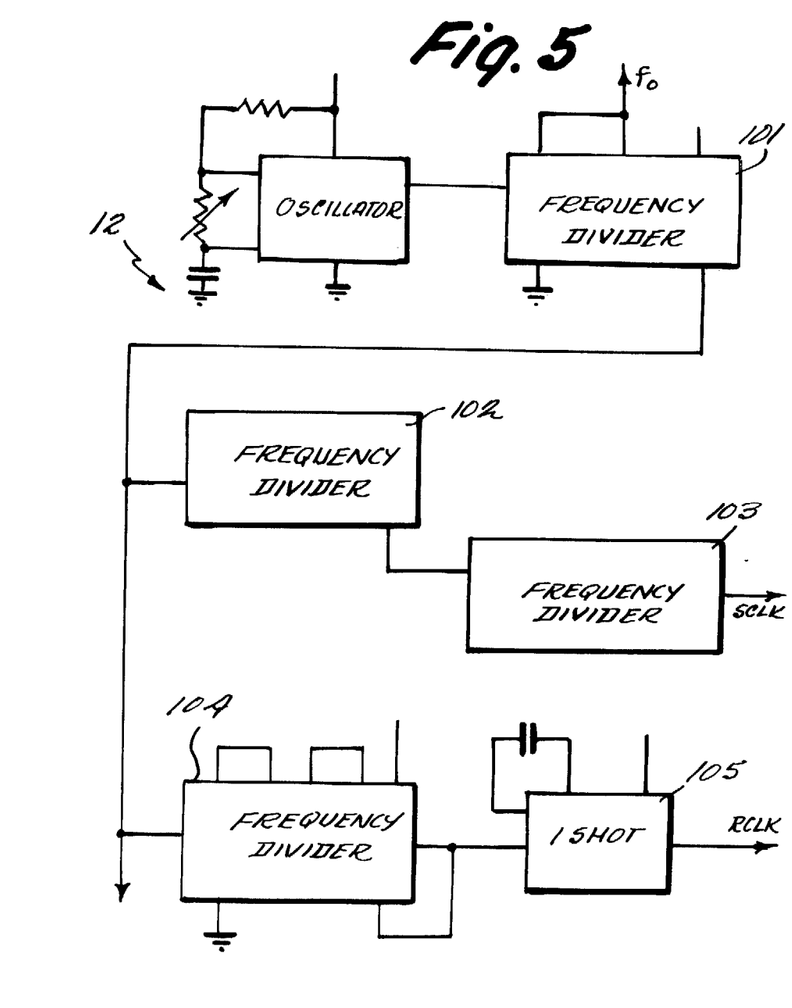
FIG. 5 is a schematic diagram illustrating one embodiment of a frequency generator circuit of the invention.

FIG. 5 shows frequency generator 12 for producing an ultrasonic frequency waveform Fo, a receiver clock pulse frequency RCLK and a pulse corresponding to the frequency of the transmitted pulses (send) SCLK which has an oscillator 100 having a frequency twice that of the desired ultrasonic frequency signal which may be, for example, 40 kHz. The oscillator 100 in this example would produce an 80 kHz. signal at its output which is divided by 2 by a frequency divider 101. The output of frequency divider 101 is connected to the input of the two series connected divided by 16 frequency dividers, the second of which is connected to the send clock input of state counter 25. The output of frequency divider 101 can also be connected to the input of a divide by 9 frequency divider 104, the output of which can be connected to a narrow pulse one-shot multivibrator, the logic 1 output of which is connected to the receive clock input RCLK of NAND-gate 30 and flip-flop 29, as described in greater details hereinafter.

Figure 6:
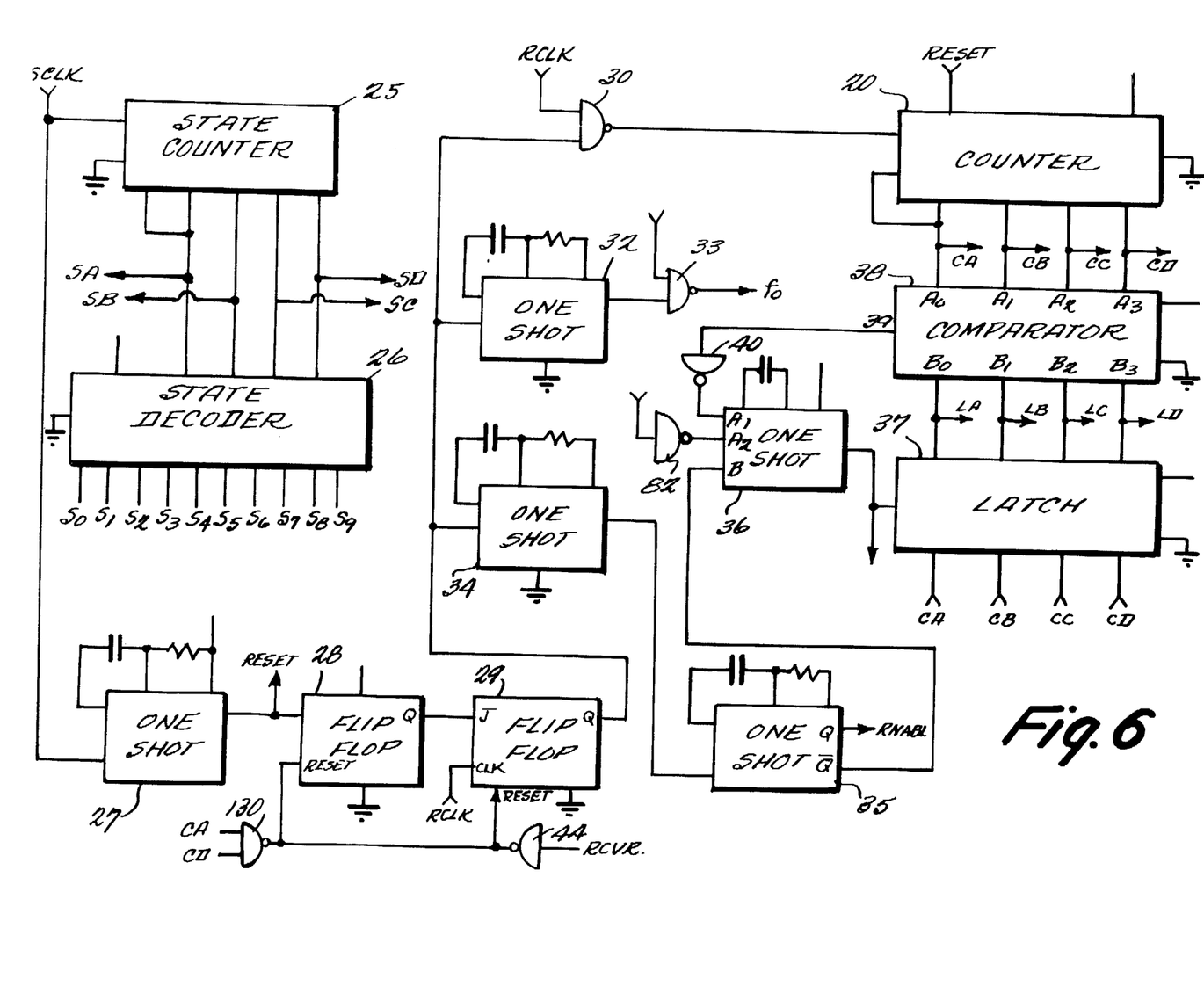
FIG. 6 is a schematic diagram of an embodiment of the timing and control unit, distance computer (counter) and distance register.
Figure 11:
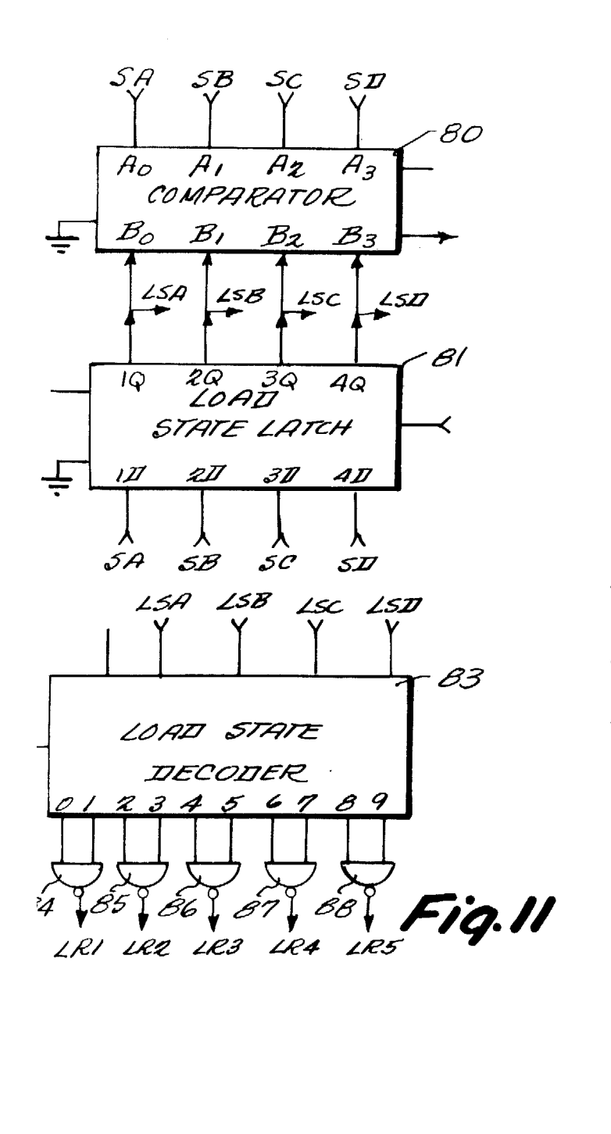
FIG. 11 is a schematic diagram illustrating one embodiment of the state register and display circuit.

The timing and control unit 13 distance computer 20, closest receiver register 22, and state comparator 23 are best described with reference to FIGS. 6 and 11. The timing and control unit 13 has a state counter 25 connected by an input line to the send clock pulse source SCLK shown in FIGS. 4 and 5 and provides a binary output to a state decoder 26. Each output line of decoder 26 represents a separate a state. The particular binary number in state counter 25 is decoded as a logic 0 on a particular output of decoder 26 while the remaining outputs are logic 1. The send clock pulse source SCLK is also connected to a one-shot multivibrator 27 which produces a time delay pulse at its output. The output terminal of one-shot multivibrator 27 is connected to the input terminal of R-S flip-flop 28. The Q output of flip-flop 28 is connected to the input J of flip-flop 29. Flip-flop 29 is connected at its output to an input terminal of NAND-gate 30 which is connected at its output to a binary counter (distance computer) 20. The other input terminal of NAND-gate 30 is connected to receive clock pulse source RCLK. Counter 20 is connected at its reset terminal to the output of one-shot multivibrator 27.

Connected to the output of flip-flop 29 is the input terminal of one-shot multivibrator 32, the output terminal of which is connected to the enabling terminal of a NAND-gate 33. Connected to the other input of NAND-gate 33 is the output terminal of the source of the sonic frequency signal $f_0$ described in FIG. 5. The output of NAND-gate 33 is connected to the input of transmitter 14, which is shown in detail in FIG. 8. Also connected to the output of flip-flop 29 is a one-shot multivibrator 34 which is in turn connected at its output to one-shot multivibrator 35. The Q output of one-shot multivibrator 35 is connected to FET transistor switch 95 through inverter 96 as shown in detail in FIG. 9. The $\overline{Q}$ output of one-shot multivibrator 35 is connected to the enabling terminal of one-shot multivibrator 36, the output of which is connected to a latch circuit 37. The binary output terminals of latch 37 are connected to the binary input terminals of comparator 38, the A terminals of which are connected to the binary output terminals of counter 31. The B terminals of comparator 38 are connected to the binary output terminals of latch 37.

Figure 7:
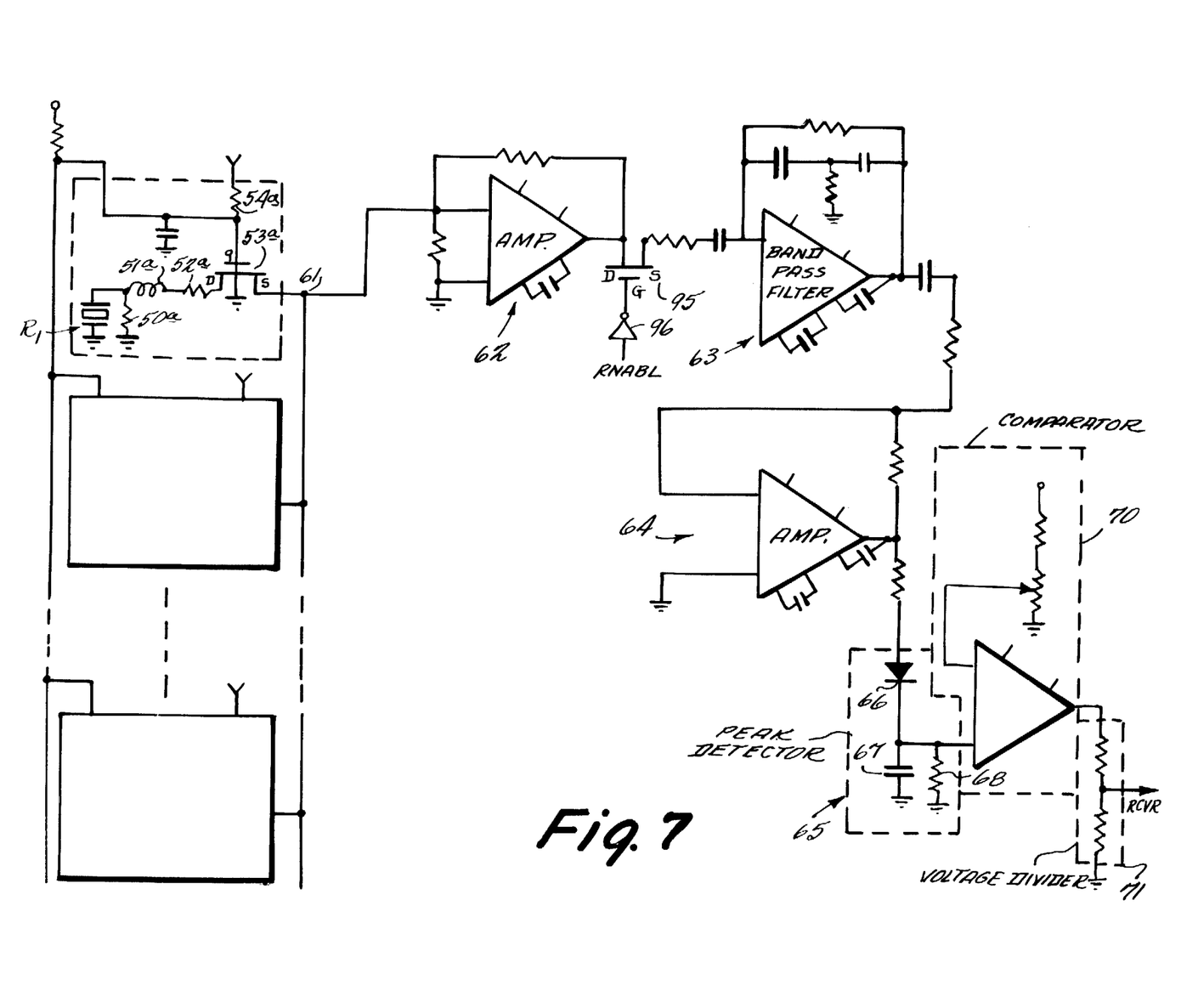
FIG. 7 is a schematic diagram of the receiver transducers and the receiver.

Connected to the clock terminal CLK of flip-flop 29 is the output from the receive clock frequency source RCLK shown in FIGS. 4 and 5. The receive signal RCVR from receiver 19, shown in FIG. 7, is connected to the reset pins of flip-flops 28 and 29, respectively, through inverter 44. The first and fourth binary output terminals of counter 31 corresponding to the values 1 and 8, respectively, are also connected to the reset pins of flip-flops 28 and 29 through a NAND-gate 130.

A comparator 80 having its A binary input terminals connected to the binary output terminals of state counter 25 and its B binary input terminals connected to the binary output terminals of a load state latch 81 is connected at its output to the $A_2$ input of one-shot multivibrator 36 through inverter 82. The term "load state" as used herein is intended to refer to the state of activation of the various transducers which is stored in load state latch 81 and decoded by a decoder 83 as described below. Load state latch 81 is also connected at its binary input terminals to the output terminals of state counter 25 and is connected at its pulse input terminal to the output terminal of one-shot multivibrator 36. The B input terminals of comparator 80 and binary output terminals of load state latch 81 are connected to the input terminals of a load state decoder 83. The output terminals of load state latch 83 corresponding to states 0 and 1 are connected to the input terminals of NAND-gate 84 of receiver multiplexer 18, terminals corresponding to states 2 and 3 are connected to the input terminals of NAND-gate 85, terminals corresponding to load states 4 and 5 are connected to the input terminals of NAND-gate 86, output terminals corresponding to load states 6 and 7 are connected to the input terminals of NAND-gate 87, and output terminals corresponding to load states 8 and 9 are connected to the input terminals of NAND-gate 88. The output terminals of NAND-gates 84 through 88 are respectively connected to lights LI-LR corresponding to receiver transducers $R_1$ through $R_5$ shown in FIG. 2.

Figure 8:
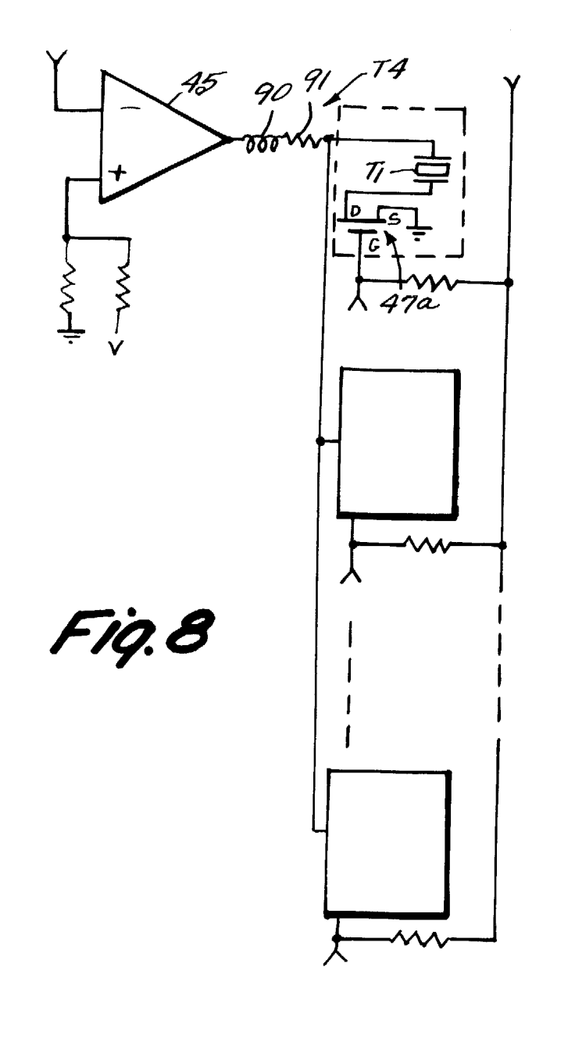
FIG. 8 is a schematic diagram of an illustrative embodiment of the transmitter transducers and the transmitter.
Figure 10:
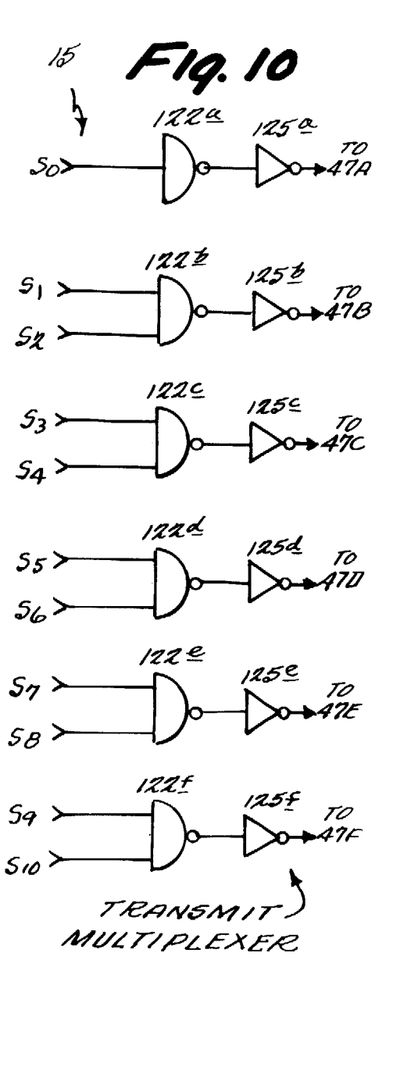
FIG. 10 is a schematic diagram illustrating one embodiment of a transmitter multiplexer.

The transmitter 14, transmit multiplexer 15 and transmitter transducers $T_1$ through $T_6$ are best described with reference to FIGS. 8 and 10. The transmitter consists of an amplifier 45 which is connected through an inductor 90 and resistor 91 to six parallel combinations of transmitter transducers $T_1$ through $T_6$ connected to the drain of an FET transistor 47a–47f, the source in each case being connected to ground and the gate in each case being connected to one of six output terminals of transmitter multiplexer 15, as is shown in greater detail in FIG. 10. Transmitter multiplexer 15 consists of six NAND-gates 122a–122f whose inputs are connected to the outputs of one or two state decoder 26 output terminals, respectively, and the outputs of which are respectively connected to the FET gates 47a–47f respectively through inverters 125a–f.

Figure 9:
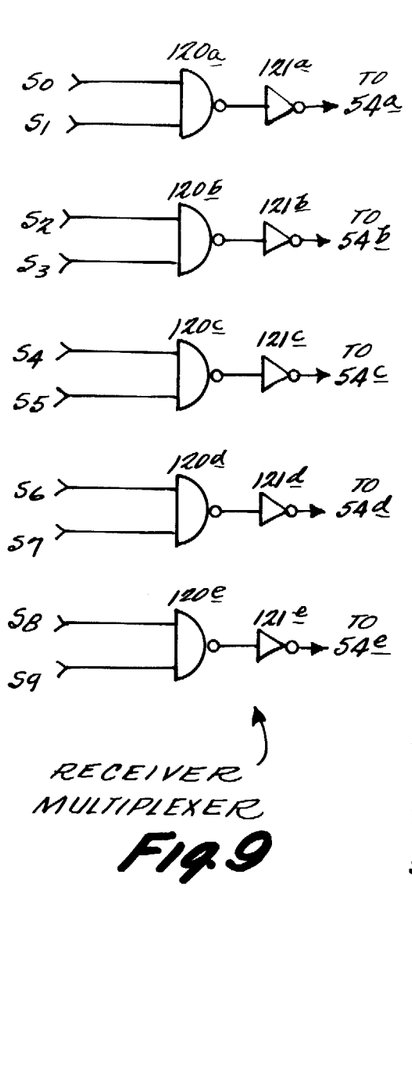
FIG. 9 is a schematic diagram of the receiver multiplexer.

The receiver 19, receiver multiplexer 18 and receiver transducers $R_1R_5$ are best described with reference to FIGS. 7 and 9. Receiver transducers $R_1$ through $R_5$ are respectively connected across resistors 50a–50e to ground at one end and respectively connected at their junction to inductors 51a–51e which are in series with resistors 52a–52e which are connected to the drains of respective FET transistors 53a–53e. The gates of the FET transistors 53a–53e are respectively connected through resistors 54a–54e to the five output terminals of receiver multiplexer 18. The multiplexer 18 consists of five NAND gates 120a–120e whose inputs are the outputs of two adjacent state decoder 26 output terminals respectively connected in series with inverters 121a–121e to the FET gate of the appropriate receiver transducer. At the junction of each gate of the FET transistors 53a–53e and resistors 54a–54e are capacitors 55a–55e which are connected at their respective sides to ground. Each of the sources of FET transistor switches 53a–53e are connected to a common point 61 which is connected to amplifier 62 the output of which is connected to the drain of an FET transistor switch 95. The source of FET transistor switch is connected to a bandpass filter 63 followed in series of amplifier 64. The output of amplifier 64 is connected to peak detector 65 which consists of a diode 66 in series with a parallel combination of capacitor 67 and resistor 68 each of which is connected to one input terminal of a comparator 70, having a reference voltage source therein. The output of the comparator is connected to a voltage divider 71 which is in turn connected to the input terminal of inverter 44.

For the ultrasonic transmit frequency of 40 KHz employed in an embodiment of the invention described herein, one form of which may be utilized is a model TR-89B/type 40 electroaustical transducer produced by Massa Corp. However, other ultrasonic frequencies ranging from 10 KH to 2 MHz and other transducers may be found to be appropriate and consistant with the proper application of this invention.

In operation the send clock pulse SCLK from frequency divider 103 of frequency generator 12 is applied to the input of state counter 25 thereby incrementing the states stored in counter 25, which causes one output terminal of state decoder 26 to have a logic 0 output, the remainder of the state decoder output terminals having a logic 1 output.

The output terminals of state decoder 26 corresponding to states So-Sg are, as indicated above, connected to appropriate terminals and receiver multiplexer 18 and transmitter multiplexer 15 so that when the system is in a particular state, the receiver multiplexer 18 will close the appropriate switch among receiver transducer switches 53a–53f and the transmitter multiplexer 15 will close the appropriate switch among transmitter transducer switches 47a–47f.

The send clock pulse SCLK is also applied to the input terminal of one-shot multivibrator 27 which causes a logic 1 delay pulse of, in this example, 21 milliseconds at its Q output terminal. The falling edge of this delay pulse causes a logic 1 voltage to appear at the Q output terminal of flip-flop 28 which enables flip-flop 29. The leading edge of the output signal from one shot multivibrator 27 will also cause the number stored in counter 31 to be reset to zero. A logic 1 voltage will appear at the output terminal of flip-flop 29 upon receipt of the next RCLK pulse following enablement of flip-flop 29. A logic voltage at the output of flip-flop 29 enables NAND-gate 30 to pass inverted RCLK pulses applied to its other terminal to the input of counter 31 which will count RCLK pulses until NAND-gate 30 is disabled. At the same time that NAND-gate 30 is enabled by a logic 1 voltage at the output of flip-flop 29, that logic 1 voltage is also applied to the input of one-shot multivibrator 32 which emits a logic 1 pulse of duration equals to the desired ultrasonic pulse which in this example is chosen to be 100 microseconds. That 100 microsecond pulse enables NAND-gate 33 for the duration of the 100 microsecond pulse and allows an ultrasonic frequency pulse of 40 kHz in this case, which will be emitted from the output of NAND-gate 33 where it is applied to the negative input terminal of transmitter amplifier 45. The ultrasonic pulse applied to the negative input terminal of transmitter amplifier 45 is gated by transmitter multiplexer 15 through one of the FET transistor switches 47a–47f, corresponding to the present state, to one of transmitter transducers $T_1$–$T_6$ causing an ultrasonic acoustic wave to be transmitted therefrom.

At the same time that the logic 1 voltage output of flip-flop 29 is introduced at the input terminal of one-shot multivibrator 32 and the enable terminal of NAND-gate 30, the logic 1 output voltage of flip-flop 29 is also applied at the input terminal of one-shot multivibrator 34 whose Q output terminal is caused to emit a short positive delay pulse, in this example 1.7 milliseconds, the falling edge of which cause one-shot multivibrator 35 to emit a logic 1 pulse at its Q output terminal and a logic 0 pulse at its $\bar{Q}$ terminal. The logic pulse from the Q terminal of one-shot multivibrator 35 causes FET switch of receiver amplifier 62 to close thereby enabling the receiver to receive previously transmitted pulses which have reflected off the object being detected as is illustrated in FIG. 7.

When one-shot multivibrator 35 emits a logic 1 pulse from its Q output terminal, the receiver amplifier switch 95 will be closed, allowing an ultrasonic signal reflected from a detected object which is received by the active transducer receiver, among $R_1$–$R_5$ corresponding to the switch among FET transistor switches 53a–53e which are closed, to cause a pulse to pass through the closed switch among switches 53a–53e. That pulse, amplified by amplifier 62, passes through switch 95, is then filtered by bandpass filter 63, is then amplified by amplifier 64, is detected by peak detector 65 and is then compared to a reference voltage in comparator 70 and is then inputted to inverter 44 through voltage divider 71. The inverted receiver pulse received from voltage divider 71 is then inputted to flip-flops 28 and 29 which cause their output voltages to go to logic 0 which disables NAND-gate 30, stopping the count in counter 31. In the event that counter 31 receives 9 clock pulses an object not having been detected within the detection range of the system in a particular state, the first and fourth output terminals of counter 31 which have positive voltages when storing the binary number 9 will cause NAND-gate 130 to pass a logic 0 voltage to the reset pins of flip-flops 28 and 29 thereby causing NAND-gate 30 to be disabled and stopping the count in counter 31. As a result, the digital distance display 9 will show a nine whenever all states of the system detect no object within its 9 foot range.

When the Q output terminals of one-shot multivibrator 35 return to logic 0, one-shot multivibrator 36 is enabled. If the binary number stored in counter 31 which represents the distance just measured is less than the binary number stored in latch 37 which represents a shortest previous detected distance to a detected object, i.e., A is less than B, then logic 1 voltage will appear at terminals 39 of comparator 38 which will be inverted by inverter 40 causing enabled one-shot multivibrator 36 to transmit a pulse to latch 37 replacing the previous held binary number B with the number A in the counter 31. The binary number in the latch 37 which appears at the binary output terminals of latch 37 will cause digital display screen to display the number of feet from the receiver transducer to the object detected by means well known in the art.

Also, irrespective of whether or not the binary values at the A terminals of comparative 38 are less than the binary values at the B terminals of comparative 38, one-shot multivibrator 36 will be turned on if the system has sequenced through all of the states without a reduction in the distance measured to the object. In that circumstance, the value stored in the load-state latch 81 would be equal to the value stored in the state counter 25 a logic 1 voltage would appear at the output terminal of loadstate comparator 80 causing one-shot multivibrator 36 to emit a logic 1 pulse to latch 37 thereby causing the new distance measurement appearing at the output terminals of counter 1 to replace the previous value stored in the latch 37. The pulse from multivibrator 36 would, of course, also concurrently input to load-state latch 81 causing the state representation which appears at the output terminals of state counter 25 replace the previous state in latch 81.

If, on the other hand, a full sequence of states has not occurred since the last change in the state stored in latch 81 and the number A appearing at the A terminals of comparator 38 is greater or equal to the number B represented at the B terminals of comparator 38 and stored in latch 37, then the voltage at terminal 39 will be logic 0 and the number B in latch 37 and the state values in load state latch 81 will be retained in their respective latches.

Similarly, if A is less than B, then the logic 1 pulse from one-shot multivibrator 36 will cause binary state counter values appearing at the output of state counter 25 to be stored in load state latch 81. Load state decoder 83 will then decode the values in load state latch 81 and NAND-gate 84 through 88 at the outputs of load state decoder 83 will cause the light corresponding to the appropriate receiver transducer $R_1R_5$ to be lighted.

It will be recognized that the present invention has a wide range of applicability and is susceptable to modification by those skilled in the art to include various arrangements of the number of transmitter transducers and receiver transducers and sequencing systems for measuring and locating objects with respect to the transmitter transducer and receiver transducer arrangement. It will be further appreciated that the frequency at which the system may be operated may be altered and the range and simultaneous locating and providing information as to distance may similarly be modified by utilizing various techniques and electronic components to provide the advantages of the sequencing system of the invention. These and other such modifications and applications of the present invention may be made within the spirit and scope of the invention as defined in the appended claims.

What is claimed is:

1. A system for locating and determining the distance of a first object with respect to a receiver transducer mounted on a reference object using ultrasonic wave pulses comprising:
  (a) at least three transducers; wherein at least two of said three transducers operate as receiver transducers and at least one of said three transducers operates as a transmitter transducer; and
  (b) means for sequentially activating each of said transducers such that each pair of one transmitter transducer and one receiver transducer pair is activated for a period of time commensurate with the range of the system prior to activating another transmitter transducer and receiver transducer pair; and
  (c) means for simultaneously determining distance and location of said object with respect to said transducers including means for identifying the transmitter transducer of that one said transmitter transducer and receiver transducer pair which is activated which is receiving an ultrasonic wave return pulse from said first object within said range of the system and means for automatically calculating at which one of a plurality of discrete different distances within said range at which said first object is positioned relative to said one of said transmitter transducer and receiver transducer pairs which is activated, based upon elapsed time between the activation of one transmitter transducer and receiver transducer pair and said ultrasonic wave pulse return.

2. A system for locating and determining the distance of a first object with respect to a receiver transducer mounted on a reference object using ultrasonic wave pulses comprising:
  (a) at least three transducers; wherein at least two of said three transducers operate as transmitter transducers and at least one of said three transducers operates as a receiver transducer; and
  (b) means for sequentially activating each of said transducer such that each pair of one transmitter transducer and one receiver transducer is activated for a period of time commensurate with the range of the system prior to activating another transmitter transducer and receiver transducer pair; and
  (c) means for simultaneously determining distance and location of said object with respect to said transducers including means for identifying the receiver transducer of that one of said transmitter transducer and receiver transducer pair which is activated which is receiving the ultrasonic wave return pulse from said first object within said range of the system and means for automatically calculating at which one of the plurality of discrete different distances within said range at which said first object is positioned relative to said one of said transmitter transducer and receiver transducer pairs which is activated, based upon elapsed time between the activation of one transmitter transducer and receiver transducer pair and said ultrasonic wave pulse return.

3. A system for locating and determining the distance of a first object with respect to a receiver transducer mounted on a reference object when said first object is disposed within a given range of the system using ultrasonic wave pulses comprising;
  (a) at least four transducers; wherein at least two of said at least four transducers operate as receiver transducers and at least two of said four transducers operates as transmitter transducers, said transducers being arranged in an array of alternating transmitter transducer and receiver transducers, each combination of two adjacent transducers defining a transmitter transducer and receiver transducer pair;
  (b) means for sequentially activating each of said transducers such that each transmitter transducer and receiver transducer pair is activated for a period of time commensurate with said range of the system prior to activating another transmitter transducer and receiver transducer pair; and
  (c) means for simultaneously determining distance and location of said object with respect to said transducers including means for identifying the transmitter transducer and receiver transducer pair which is activated and means for automatically calculating at which one of a plurality of discrete different distances within said range at which said first object is positioned relative to said one of said transmitter transducer and receiver transducer pairs which is activated, based upon elapsed time between the activation of said one transmitter transducer and receiver transducer pair and said ultrasonic wave pulse return.

4. A system as in claim 1 or claim 2 or claim 3 wherein said means for sequentially activating comprises a single transmitter, a single receiver and means for selectively and sequentially coupling one of said transmitter transducers and one of said receiver transducers which define one of said transmitter transducer and receiver transducer pairs, to said transmitter and said receiver, respectively, for said period of time.

5. The system for locating and determining the distance of an object as described in claim 4, wherein said means for sequentially and selectively coupling comprises a state counter for determining various states of activation of said transducers.

6. The system for locating and determining the distance of an object as described in claim 5 wherein said means for sequentially and selectively coupling comprises a multiplexer means.

7. The system for locating and determining the distance of an object as described in claim 6 wherein said multiplexer means comprises a receiver multiplexer and a transmitter multiplexer.

8. The system for locating and determining the distance of an object as described in claim 7 wherein
  said means for simultaneously determining distance and location of an object comprises a source for generating receive clock pulses and a counter for counting the number of receive clock pulses generated.

9. The system for locating and determining the distance of an object as described in claim 8 wherein said means for simultaneously determining the distance and location of an object further comprises:
  storage means for storing the number of said receive clock pulses counted by said counter and means for comparing the number of said receive clock pulses stored in said storage means to the number of receive clock pulses counted by said counter.

10. The system for locating a determining the distance of an object as described in claim 9 wherein said means for storing comprising a latch and said means for comparing comprises a comparator.

11. The system for locating and determining the distance of an object as described in claim 10 wherein said means for simultaneously determining the distance and location of an object further comprises means for storing a particular state of activation of said transducers.

12. The system for locating and determining the distance of an object as described in claim 11, further comprising means, connected to said means for storing a particular state of activation, for visually displaying an indication of which of said at least 2 receiver transducers is closest to said detected object.

13. The system for locating and determining the distance of an object as described in claim 12, further comprising:
   means, connected to said latch, for digitally displaying the distance from said closest receiver transducer.

14. The system for locating and determining the distance of an object as described in claim 13, further comprising an audible alarm means connected to said latch for providing a warning if the said determined distance is less than same prescribed value.

* * * * *